Patented Jan. 19, 1937

2,068,284

UNITED STATES PATENT OFFICE 2,068,284

METHOD FOR THE PRODUCTION OF DERIVATIVES OF CYCLIC β-KETO CARBOXYLIC ACIDS

Karl Ziegler, Heidelberg, Germany, assignor to Schering-Kahlbaum A. G., Berlin, Germany, a corporation of Germany No Drawing. Application November 16, 1934, Serial No. 753,303. In Germany November 18, 1933

16 Claims. (Cl. 260—99.30)

This invention relates to organic cyano-compounds and more especially to cyclic cyanoketones and cyanoketimides, and to the process of producing such compounds and is a continuation in part of our copending application Serial No. 684,233, filed August 8, 1933.

This copending application refers to a process which consists in treating nitriles of the formula

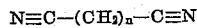

with condensing agents of the type

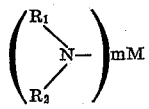

wherein $R_1$ and $R_2$ indicate an alkyl, aralkyl, aryl, or an alicyclic radical, M an alkali, alkaline earth, or earth metal, as for instance Li, Na, Mg, or Al, and $m$ the valency of said metal and in saponifying the α-cyano ketimides formed, if required. In the book by K. A. Hofmann entitled "Lehrbuch der Anorganischer Chemie", sixth edition, 1928, page 476, the earth metals are defined as including in addition to aluminum, those metals, the oxides of which are designated as "rare earths".

Now, it has been found that, in order to successfully carry out the cyclization, it is essential to use a condensing agent of the type

wherein $R_1$ is an aromatic, $R_2$ a non-aromatic radical, M an alkali metal, in homogeneous solution and preferably in a concentration being near to the concentration of saturation or even in saturated solution while the dinitrile to be cyclized, is kept in the reaction mixture continuously in a concentration as low as possible, as stated in the main application.

Furthermore, it has been found that the yield of cyclic cyano-ketimides under otherwise comparable conditions is the better, the higher the atomic number of the used alkali metal is.

These conditions will be explained in detail by the following experiments which were carried out in the following manner:

3 liters of an ethereal condensing agent are heated under reflux to boiling thereby excluding the presence of air. Thereupon a solution of 0.2 mols of the dinitriles with 16 or 18 carbon atoms in ether was allowed to flow within 72 hours continuously into the first named solution; thereupon the reaction mixture is decomposed by water and the ether is evaporated; the amine formed is then distilled off with steam.

The non-volatile residue represents the crude α-cyanoketimide.

For determining the yield of the cyclic product it proved to be expedient to saponify the crude ketimide to the corresponding cyclic ketone by boiling the former for 5 hours with 70% sulfuric acid and to isolate the ketones in a suitable manner, for instance, by distillation with superheated steam.

The following table contains the results.

| Condensing agent | Mol/l | Yield of | |
|---|---|---|---|
| | | Ketone $C_{15}$ | Ketone $C_{17}$ |
| | | Percent | Percent |
| Li-ethyl anilide | 0.14 | 22 | 33 |
| Do | 0.7 | 33 | 45 |
| Do | 2.0 | 46 | 57 |
| Na-methyl anilide | 0.6 | 65 | 75 |

Hence, the most favorable results, according to these data are obtained with saturated solutions of the condensing agents; and when comparing different condensing agents composed of the same metal radical, those condensing agents having the higher solubility are to be preferred in general.

The explanations indicate that in order to obtain high yields of the cyclization product, preferably a greater excess of the reagent is to be employed.

Since by said modification of the method of the main application the yield can be increased to almost three times the yield obtained when producing derivatives of the 15-membered ring system according to the process of the main patent and to more than twice the yield obtained when producing derivatives of the 17 membered ring system, it represents a considerable technical advance.

The new knowledge can furthermore be made use of in another manner in order to technically simplify the method described in the main patent application Serial No. 684,233.

It was realized that it is very important, that the dinitrile when synthesizing compounds with more than six ring members has always to be present in the reaction mixture in a very low concentration; this is usually achieved by causing the dinitrile to flow very slowly into the condensing agent. Said flowing-in of the dinitrile into the condensing agent, however, requires often several days.

When, for instance, under the above mentioned conditions at a concentration of 0.14 n lithium ethyl-anilide a yield of 33-35% of the theoretical amount of the cyanoketimide with 15 ring members is to be achieved, a time of reaction of 14 days is necessary. On the other hand, with a 0.7 n solution of the condensing agent the same result is obtained in 3 days.

Hence, this invention can be made use of first to increase the yield in the same period of time of reaction and furthermore to produce the same yields in a substantially shorter period of time, a fact which is of great importance for technically carrying out this process.

Example 1

An ethereal solution of sodium methylanilide is produced from 20 grams of metallic sodium, 56 grams of naphthalene and 116 grams of methyl aniline in 1.3 liters of absolute ether.

A solution of 21 grams of tridecane-1,13-dicarboxylic acid dinitrile (melting point 31-31.5° C.) is caused to run into said first solution within a period of 72 hours while vigorously boiling and stirring. After decomposition with water a clear, yellowish solution is obtained from which, after distilling off the ether, methylaniline and dihydro naphthalene are removed by blowing off with steam. The residue which is at first resinous, solidifies on triturating with ether and yields after filtering by suction 10.3 grams of 1-cyano tetradecanone imide-(2) in the form of colorless crystals of the melting point 147-148° C. (recrystallized from acetic acid ester). The mother liquors retain some of the product in mixture with other resins. In order to determine the total yield, they are boiled for 5 hours with 70% sulfuric acid and are distilled with steam. Thereby 1.85 grams of cyclotetradecanone of the melting point 53° C. are recovered so that the total yield of the cyclization product amounts to about 62%.

Example 2

An ethereal solution of sodium isoamyl anilide is produced from 46 grams of sodium, 128 grams of naphthalene, 380 grams of isoamyl aniline and 4 liters of ether. A solution of 23 grams of pentadecane-1,15-dicarboxylic acid nitrile (melting point 40-41° C.) in 300 cc. of ether is allowed to flow into said first-named solution within 32 hours.

The obtained cyanoketimide which contains a 16-membered ring, crystallizes with difficulty. Hence, in order to determine the yield it is directly saponified by heating for 5 hours with 70% sulfuric acid. On consecutive steam distillation 16.12 grams of cyclohexadecanone are obtained, i. e. 77% the theoretical amount.

Example 3

In the same manner as described in Examples 1 and 2 azelaic acid dinitrile is transformed into cyano cyclo-octanone imide, whereby the yield amounts to about 90% of the theoretical amount. The cyanoketimide forms colorless crystals of the melting point 106-107° C.

Of course, the given examples serve merely to illustrate the invention; various other modifications and changes in the processes and reagents may be made by those skilled in the art in accordance with the principles set forth herein and in the claims annexed hereto.

What I claim, is:

1. A method of producing cyclic α-cyanketone compounds consisting in acting on a nitrile having the formula

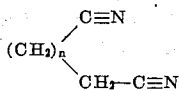

n being an integer, with a condensing agent of the type

wherein $R_1$ is an aromatic and $R_2$ a non-aromatic organic, alkyl or alicyclic radical, while M is an alkali metal.

2. A method of producing cyclic α-cyanoketone compounds consisting in acting on a nitrile having the formula

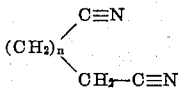

n being an integer, with a condensing agent of the type

wherein $R_1$ is an aromatic and $R_2$ a non-aromatic organic, alkyl or alicyclic radical, while M is an alkali metal, the concentration of said condensing agent in solution being essentially at the point of saturation.

3. A method of producing cyclic α-cyanoketone compounds consisting in acting on a nitrile having the formula

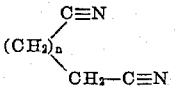

n being an integer, with a condensing agent of the type

wherein $R_1$ is an aromatic and $R_2$ a non-aromatic organic, alkyl or alicyclic radical, while M is an alkali metal, the concentration of said condensing agent in solution being kept essentially at the point of saturation during the reacton.

4. A method of producing cyclic α-cyanoketone compounds consisting in acting on a nitrile having the formula

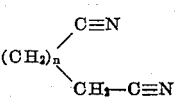

n being an integer, with a condensing agent of the type

wherein $R_1$ is an aromatic and $R_2$ a non-aromatic organic, alkyl or alicyclic radical, while M is an alkali metal, the concentration of said condensing agent in solution being kept essentially at the point of saturation during the reaction, while the concentration of the dinitrile to be reacted in the reaction mixture is kept as low as possible during the reaction.

5. A method of producing cyclic α-cyanoketone compounds consisting in acting on a nitrile having the formula

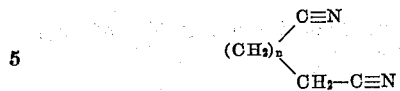

$n$ being an integer, with a condensing agent of the type

wherein $R_1$ is an aromatic and $R_2$ a non-aromatic organic, alkyl or alicyclic radical.

6. A method of producing cyclic α-cyanoketone compounds consisting in acting on a nitrile having the formula

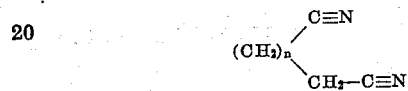

$n$ being an integer, with a condensing agent of the type

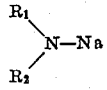

wherein $R_1$ is an aromatic and $R_2$ a non-aromatic organic, alkyl or alicyclic radical, the concentration of said condensing agent in solution being kept essentially at the point of saturation during the reaction.

7. A method of producing cyclic α-cyanoketone compounds consisting in acting on a nitrile having the formula

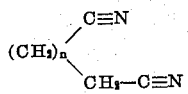

$n$ being an integer, with a condensing agent of the type

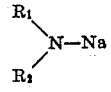

wherein $R_1$ is an aromatic and $R_2$ a non-aromatic organic, alkyl or alicyclic radical, the concentration of said condensing agent in solution being essentially at the point of saturation during the reaction, while the concentration of the di-nitrile to be reacted in the reaction mixture is kept as low as possible during the reaction.

8. A method of producing cyclic α-cyanoketone compounds consisting in acting on a nitrile having the formula

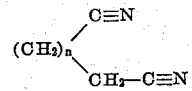

$n$ being an integer, with a condensing agent of the type

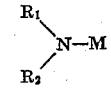

wherein $R_1$ is an aromatic and $R_2$ a non-aromatic organic, alkyl or alicyclic radical, while M is an alkali metal, decomposing the reaction mixture with water and isolating the resulting cyanoketimide.

9. A method of producing cyclic α-cyanoketone compounds consisting in preparing an essentially saturated solution of a condensing agent of the type

wherein $R_1$ represents an aromatic and $R_2$ a non-aromatic organic, alkyl or alicyclic radical while M is an alkali metal, in an indifferent organic solvent, allowing a solution of a dinitrile having the formula

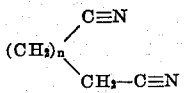

$n$ being an integer, in the same solvent, to flow gradually, uniformly and slowly into said solution of the condensing agent while vigorously boiling and stirring, decomposing the reaction mixture with water and isolating the resulting cyanoketimide.

10. A method of producing cyclic α-cyanoketone compounds consisting in acting on a nitrile having the formula

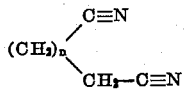

$n$ being an integer, with a condensing agent of the type

wherein $R_1$ is an aromatic and $R_2$ a non-aromatic organic, alkyl or alicyclic radical, while M is an alkali metal, decomposing the reaction mixture with water, isolating the resulting cyanoketimide and saponifying the same with an agent which is sufficiently mild to change the imido group into a keto group without saponifying the cyano group.

11. A method of producing cyclic α-cyanoketone compounds consisting in acting on a nitrile having the formula

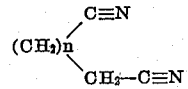

$n$ being an integer, with a condensing agent of the type

wherein $R_1$ is an aromatic and $R_2$ a non-aromatic organic, alkyl or alicyclic radical, while M is an alkali metal, decomposing the reaction mixture with water, and subjecting the α-cyanoketimide thus formed to saponification with an agent which is sufficiently mild to change the imido group into a keto group without saponifying the cyano group.

12. A method of producing cyclic α-cyanoketone compounds consisting in acting on a nitrile having the formula

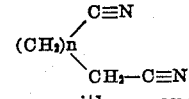

$n$ being an integer, with a condensing agent of the type

wherein $R_1$ is an aromatic and $R_2$ a non-aromatic organic, alkyl or alicyclic radical, while M is an alkali metal, decomposing the reaction mixture with water, heating the resulting reaction product with 70% sulfuric acid and isolating the saponification product.

13. The α-cyanocycloketimides of the general formula

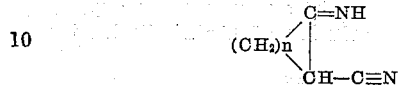

wherein $n$ denotes an integer which is 5 or greater.

14. The α-cyanocyclotetradecanone imide of the structural formula

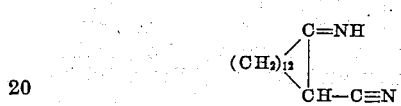

which crystallizes from acetic acid ester in the form of colorless crystals of the melting point 147–148° C.

15. The α-cyanocyclooctanone imide of the structural formula

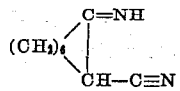

which forms colorless crystals of the melting point 106–107° C.

16. The α-cyanocyclohexadecanone imide of the structural formula

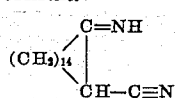

which crystallizes with difficulty.

KARL ZIEGLER.